(12) United States Patent
Blaurock et al.

(10) Patent No.: US 6,575,630 B2
(45) Date of Patent: Jun. 10, 2003

(54) ROLLING ELEMENT CHAIN

(75) Inventors: Günter Blaurock, Niederwerrn (DE);
Rudolf Schlereth, Frauenroth (DE);
Hans-Georg Stender, Hambach (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 10/061,022

(22) Filed: Jan. 30, 2002

(65) Prior Publication Data

US 2002/0118898 A1 Aug. 29, 2002

(51) Int. Cl.$^7$ ................................................ F16C 29/06
(52) U.S. Cl. ............................ 384/43; 384/44; 384/45
(58) Field of Search .......................... 384/43, 45, 44, 384/49, 51

(56) References Cited

U.S. PATENT DOCUMENTS

| | | | |
|---|---|---|---|
| 1,241,669 A | 10/1917 | Schneider | |
| 2,557,476 A | 6/1951 | Schwitter | |
| 2,566,421 A | 9/1951 | Lapointe | |
| 2,897,021 A | 7/1959 | Zeilman | |
| 2,987,350 A | 6/1961 | Hay | |
| 3,292,981 A | 12/1966 | Zaugg | |
| 3,486,212 A | 12/1969 | Vannest | |
| 3,682,284 A | 8/1972 | Sakamoto | |
| 3,733,110 A | 5/1973 | Davis | |
| 4,175,805 A | 11/1979 | Becker et al. | |
| 4,243,131 A | 1/1981 | Young | |
| 4,946,294 A | 8/1990 | Yamada | |
| 5,156,462 A | 10/1992 | Jacob et al. | |
| 5,295,749 A | 3/1994 | Takahashi et al. | 384/568 |
| 5,927,858 A | 7/1999 | Agari | 384/45 |
| 6,049,988 A | 4/2000 | Shirai | 33/1 |

FOREIGN PATENT DOCUMENTS

| | | |
|---|---|---|
| DE | 909 236 | 4/1951 |
| DE | 835 718 | 5/1951 |
| DE | 1 575 484 | 1/1970 |
| DE | 21 23 529 | 12/1972 |
| DE | 26 02 265 | 7/1976 |

(List continued on next page.)

Primary Examiner—Lenard A. Footland (57) ABSTRACT

A rolling element chain (10) comprises a plurality of rolling elements (14) arranged in close succession and a longitudinal supporting band (12). The supporting band (12) in turn comprises a plurality of recesses (16) for the accommodation of the rolling elements (14), a plurality of retaining elements (20) for retaining the rolling elements accommodated in the recesses (16), where each rolling element (14) is assigned at least one retaining element (20), and at least one longitudinal flexible element (18) for interconnection of the retaining elements (20). Each rolling element (14) is retained, by the at least one retaining element (20) assigned to it, in the longitudinal direction (L) of the supporting band (12) either at its leading side only or at its following side only.

22 Claims, 4 Drawing Sheets

FOREIGN PATENT DOCUMENTS

| | | |
|---|---|---|
| DE | 26 10 707 | 8/1977 |
| DE | 26 18 535 | 11/1977 |
| DE | 27 35 152 | 2/1979 |
| DE | 29 11 614 | 10/1979 |
| DE | 29 06 128 | 8/1980 |
| DE | 30 23 978 | 1/1982 |
| DE | 33 41 778 | 5/1984 |
| DE | 33 24 840 | 10/1984 |
| DE | 33 48 358 | 10/1984 |
| DE | 34 34 197 | 3/1986 |
| DE | 35 26 626 | 1/1987 |
| DE | 36 35 261 | 7/1987 |
| DE | 36 21 770 | 1/1988 |
| DE | 36 35 725 | 4/1988 |
| DE | 37 09 039 | 10/1988 |
| DE | 3626174 | 11/1988 |
| DE | 37 22 651 | 1/1989 |
| DE | 38 12 377 | 6/1989 |
| DE | 38 24 191 | 1/1990 |
| DE | 8914085 | 2/1990 |
| DE | 287 313 | 2/1991 |
| DE | 40 25 011 | 2/1992 |
| DE | 41 03 672 | 8/1992 |
| DE | 42 10 060 | 10/1992 |
| DE | 198 30 578 | 2/1999 |
| DE | 198 24 250 | 12/1999 |
| EP | 0076754 | 9/1982 |
| EP | 0159487 | 2/1985 |
| EP | 0351499 | 12/1992 |
| EP | 0743465 | 11/1996 |
| JP | 47-29037 | 12/1972 |
| JP | 47-29137 | 12/1972 |
| JP | 56-148119 | 4/1980 |
| JP | 61-150524 | 7/1986 |
| JP | 620111709 | 5/1987 |
| JP | 62-242126 | 10/1987 |
| JP | 64-12129 | 1/1989 |
| JP | 5-52215 | 3/1993 |
| JP | 5-52217 | 3/1993 |
| JP | 5-119147 | 5/1993 |
| JP | 5-126149 | 5/1993 |
| JP | 5-196036 | 8/1993 |
| JP | 08338430 | 12/1996 |
| JP | 10-89358 | 4/1998 |
| WO | WO 87/04502 | 7/1987 |
| WO | WO 95/32366 | 11/1995 |

ROLLING ELEMENT CHAIN

TECHNICAL FIELD OF THE INVENTION

The present invention relates to a rolling element chain of the type including a plurality of rolling elements arranged in close succession, a longitudinal supporting band having a plurality of recesses for the accommodation of the rolling elements, a plurality of retaining elements for retaining the rolling elements accommodated in the recesses, each rolling element being assigned at least one retaining element, and at least one longitudinal flexible element for interconnecting the retaining elements.

BACKGROUND OF THE INVENTION

A rolling element chain of this kind is disclosed in, for example, DE 198 24 250 A1.

Japanese Letters of Disclosure 5-52217 (1993) for Japanese Patent Application 3-235563 (1991) disclose a rolling element chain, which comprises a plurality of balls that are arranged in recesses of a supporting band. A retaining element having, at each of its leading and following sides in the longitudinal direction of the supporting band, a retaining surface for sliding engagement with the leading or following ball is arranged between two successive balls in each instance. The retaining elements are interconnected by means of two flexible strip elements and together therewith form the supporting band.

This known ball-bearing chain has the advantage that the balls may be arranged in close succession, i.e., at a short distance apart. In such case, the ratio of the ball diameter to the distance between the midpoints of two adjacent balls is approximately 1:1. Because of the resultant high ball density, the known ball-bearing chain has a high loading or carrying capacity. However, stiffening of the supporting band, which goes hand in hand with fastening of the two strip elements to the retaining elements in the region between two successive balls, is disadvantageous. The strip elements of the supporting band are able to react to bending of the supporting band about an axis running parallel to the transverse direction of the band, for example in the turn-around sections of the raceway of a linear bearing, only in the region of the lateral contact of the band with the balls, but not in the region of its lateral fastening to the retaining elements.

The consequent relatively high bending of the supporting band in the region of its lateral contact with the balls results in a corresponding restoring force of the band in its straight-line position, resulting from the elasticity of the material of the supporting band. Because of the retaining engagement of the supporting band with the balls, this restoring force influences the motion of the balls in the turn-around sections of the raceway. In a linear bearing provided with the known rolling element chain, high bending of the supporting band may result in the pronounced development of noise, in increased friction of the strip elements in the guide grooves, and in deterioration in fatigue strength because of high bending stress.

Other ball-bearing chains with balls in close succession are disclosed, for example, in U.S. Pat. No. 2,897,021 and U.S. Pat. No. 3,292,981. In these chains, too, a retaining element that has a retaining surface for sliding engagement with the preceding ball as well as a retaining surface for sliding engagement with the following ball bearing is arranged between two successive balls in each instance.

Another non-generic rolling element chain is disclosed in Japanese Letters of Disclosure 62-242126 (1987) for Japanese Patent Application 60-253865 (1985). In the rolling element chain disclosed in FIGS. 5 and 6 thereof, each rolling element is retained by two retaining elements assigned to it and to it only. Thus, two physically separate retaining elements, which are arranged in a central section of the supporting band at a specific distance apart, are provided between two successive rolling elements.

The supporting band of this known rolling element chain has the advantage that it can be bent about an axis running parallel to the transverse direction not only in the regions of its lateral contact with the rolling elements, but in the regions between two successive rolling elements as well. Owing to twice the number of bending points as compared with JP-A-5-52217 (1993), at a like curvature of a turn-around section of the raceway the supporting band is bent less at each individual bending point and influences travel of the rolling elements to a correspondingly lesser extent, which results in quieter operation of a linear bearing provided with this rolling element chain. However, the rolling element chain disclosed in JP-A-62-242126 (1987) has the disadvantage that the rolling elements are arranged in loose succession, i.e., at a relatively greater distance apart, in order to be able to provide the required space for the separate retaining elements. In that chain, the ratio of the ball diameter to the distance between the midpoints of two adjacent balls is about 1:1.5. The resulting lower density of rolling elements is attended by a corresponding decrease in loading capacity of the rolling element chain.

German Patent 835 718 discloses a rolling element chain in which the distance between successive rolling elements is about twice the diameter of the rolling elements. The rolling elements are retained by tongues, which are arranged between them, of a spring steel band carrying them. A rolling element chain with a similar distance between rolling elements, i.e., a similar loose succession of rolling elements, is disclosed in U.S. Pat. No. 2,557,476.

DE 36 35 261 A1 describes a ball-bearing chain of moderate spacing apart of the balls, i.e., the ratio of the ball diameter to the distance between the midpoints of successive balls is about 1:1.25. Each of the balls is assigned retaining elements, separated from one another, which are arranged between the balls. The retaining elements therefore are very small and can hardly provide the balls with any retention.

The ball chain disclosed in DE 29 06 128 A1 is made of a number of chain units designed independent of one another, each of which serves for the guidance of only one of the balls. This arrangement results in a loose succession of balls in which the apertures accommodating the balls provide no retention for the balls. The chain units, therefore, additionally have guide blocks, separated from the accommodation apertures, which center the chain units in the ball-bearing raceway and especially the turn-around sections with regard to travel of the balls.

In addition, reference is made to DE 37 09 039 C2, DE 89 14 085 U and U.S. Pat. No. 2,566,421.

DE 198 24 250 A1, mentioned above, improved the quietness of operation of the known chains of rolling elements discussed above by increasing the number of possible bending points of the supporting band.

In contrast, the object of the present invention is to allow the rolling element chains to become even more flexible without losing loading or carrying capacity.

SUMMARY OF THE INVENTION

According to the invention, the foregoing object is attained by a rolling element chain that comprises a plurality of rolling elements arranged in close succession and a longitudinal supporting band having a plurality of recesses for accommodation of the rolling elements. The supporting band has a plurality of retaining elements for retention of the rolling elements accommodated in the recesses, with each rolling element being assigned at least one retaining element. The supporting band further comprises at least one longitudinal flexible element for interconnection of the retaining elements, while in addition each rolling element is retained, by the at least one retaining element assigned to it, in the longitudinal direction of the supporting band either at its leading side only or at its following side only. In other words, when at least some of the rolling elements are assigned a plurality of retaining elements, the retaining elements assigned to one and the same rolling element are arranged, viewed in the longitudinal direction of the supporting band, either all before this rolling element or all after this rolling element. According to the invention, therefore, each rolling element is secured at one longitudinal side only by the retaining element(s) assigned to it in the associated recess.

Owing to the reduction, according to the invention, of the regions in which the rolling element chain has retaining elements, extension of the flexible regions of the chain is increased in countermotion. Hence, the flexibility of the chain as a whole is increased. Owing to the reduction in the number of retaining elements, however, the function of the chain in the rolling-element raceway is not impaired. Also, upon both the introduction of the chain provided with rolling elements into the raceway and its removal therefrom, the retaining elements are capable of exerting their retaining function on the rolling elements as long as the supporting band runs straight. In addition, the greater flexibility of the supporting band facilitates the installation of rolling elements.

As has already been indicated above in the discussion of the prior art, according to the invention a close succession of rolling elements is intended to mean a succession in which the ratio of the diameter of the rolling elements to the distance between the midpoints of successive rolling elements is less than 1:1.5, preferably less than 1:1.25, and most preferably approximately 1:1.

The rolling element chain according to the invention, and in particular its supporting band, may be produced in simple fashion. Thus, the band may be made in one piece, for example of a synthetic material of the group of elastomers, such as, for example, polyurethane, hytrel or the like, and preferably as an injection molding.

According to a first variant, the retaining elements assigned to two adjacent rolling elements, and preferably to all rolling elements, may be arranged either all before or all after such rolling elements. According to a second variant, however, it may alternatively be provided that the retaining elements assigned to two adjacent rolling elements are all arranged between the rolling elements. The second variant may alternatively be periodically continued, so that either all retaining elements assigned to the two rolling elements are arranged between two successive rolling elements or no retaining element at all is arranged therebetween. Also, the two variants may alternatively be used intermixed.

In the second variant, in order to be able to prevent impairment of flexibility of the supporting band in the region between successive rolling elements in the case of a small, or, indeed, in the extreme case even a vanishing distance between the retaining elements in the principal plane of the supporting band, the distance between retaining elements assigned to two adjacent successive rolling elements may increase with increasing distance from the principal plane of the supporting band. This prevents the occurrence of contact between adjacent retaining elements that would limit the bending angle, even in the case of small bending angles. At the same time, it is especially advantageous if the distance between the two adjacent retaining elements, in at least one section adjacent to the principal plane of the supporting band, increases monotonically with increasing distance from the principal plane of the supporting band.

The longitudinal supporting band may be designed conductor-like, in which the two lateral edge sections of the supporting band in each instance have a spar element, which spar elements are connected together by sprocket elements running in substantially the transverse direction of the supporting band. In a supporting band designed in this way, the retaining elements may be arranged on the sprocket elements. However, they may alternatively be arranged on the spar elements or alternatively on the sprocket elements as well as on the spar elements.

In accordance with the invention, at least one sprocket element may be designed as a double sprocket element, i.e., be divided into two partial sprocket elements by a slot running transverse to the direction of travel. At the same time, two partial sprocket elements forming a double sprocket element may be connected, separated from one another, with a spar element. Such connection may alternatively be made via a common crosspiece. In order to minimize the effect on the flexibility of the supporting band, it is additionally proposed that this crosspiece be tapered toward the spar element.

The at least one retaining element assigned to each rolling element preferably projects below and/or above the principal plane of the supporting band. This provides a retaining surface extending over a great angular range, which ensures secure retention of the rolling element. The possible angular range is limited only in that the retaining elements should not drag on a bearing surface of the rolling elements, particularly at a turn-around section of the raceway of the supporting band.

Especially secure retention of a rolling element can be obtained when the rolling element is retained, on the one hand, by as great as possible a portion of the peripheral surface of the recess accommodating the rolling element and, on the other, by a plurality of retaining elements. Preferably, the retaining elements may in addition have a contact or retaining surface that is adapted to the outer contour of the rolling element.

A retaining element may, for example, be cylindrically shaped, and a cylindrical cover surface thereof turned toward a rolling element may assume the function of a contact or retaining surface. When the retaining element is assigned to a spherical rolling element, a spherical-concave shape of the cover surface is advantageous. In addition, the axis of a retaining element designed in this way may lie parallel to the longitudinal direction of the guide band. A retaining element designed in this way preferably is arranged in the central section of the guide band.

The retaining elements may alternatively be arranged in the edge regions of the guide band, especially when more than one retaining element is assigned to a rolling element. Then, for example, retaining elements may be arranged at both edge sections of the guide band. Such an arrangement is especially advantageous when the rolling elements are balls. In such case, segments of a hollow ball or alternatively sections of a ring may be considered for the form of the retaining elements.

The forms of retaining elements discussed above may be combined with one another and, alternatively, with other possible variants.

BRIEF DESCRIPTION OF THE DRAWINGS

The invention will be explained in detail below by several examples, with the aid of the accompanying drawing, wherein.

DETAILED DESCRIPTION OF EXEMPLARY EMBODIMENTS

Figure 1:
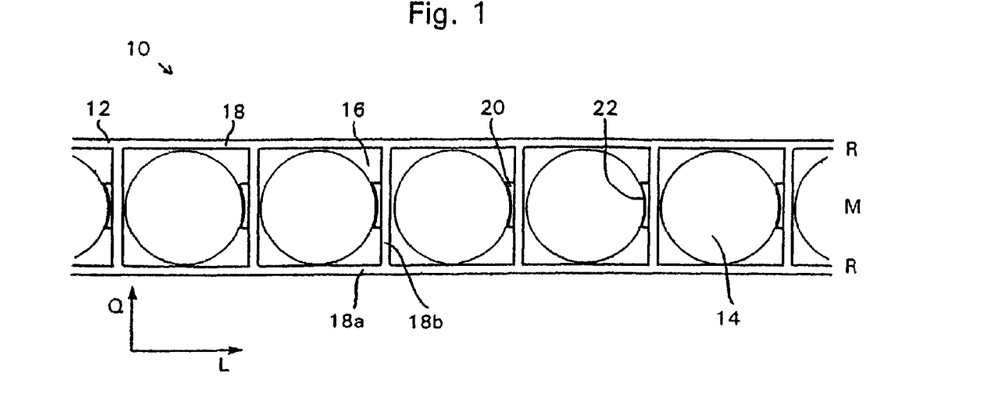
FIGS. 1 to 6 represent embodiments of the rolling element chain according to the invention in top view.

In FIG. 1, a rolling element chain according to the invention is designated generally by 10. It comprises a longitudinal, flexible supporting band 12 that has two edge sections R and a center section M. Rolling elements 14, for example balls, are accommodated in recesses 16 of the supporting band 12. The rolling elements 14 are retained in the recesses 16 by means of retaining elements 22.

The supporting band 12 comprises a flexible element 18, designed conductor-like, with two spars 18a extending in the longitudinal direction L and a plurality of sprocket elements or crossbars 18b extending in the transverse direction Q. The sprocket elements 18b separate the recesses 16 from one another and, in addition, prevent direct, and thus frictional, contact between two successive rolling elements 14, which results in better operating behavior.

Each rolling element 14 is assigned a single retaining element 20, which is arranged in the center section M of the supporting band 12 and projects above as well as below the principal plane formed by the supporting band 12. At its side turned toward the rolling element 14, the retaining element 20 has a contact or retaining surface 22 adapted to the surface of the rolling element 14. For example, if the rolling elements 14 are balls, this contact or retaining surface 22 is preferably spherical-concave in shape.

In the embodiment represented in FIG. 1, the retaining elements 20 are all arranged on the same side of the rolling elements 14, namely on their right side as viewed in FIG.

Figure 2:
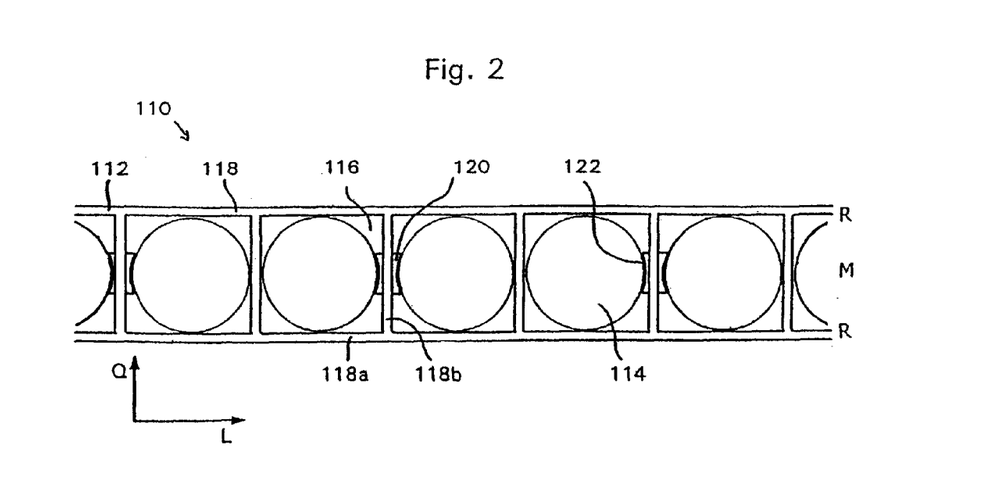

Represented in FIG. 2 is an additional embodiment of a rolling element chain according to the invention, which corresponds substantially to the embodiment of FIG. 1. Therefore analogous parts are provided with the same reference numerals as in FIG. 1, but increased by the number 100. In addition, the embodiment of FIG. 2 will be described below only insofar as it differs from the embodiment of FIG. 1, the description of which is otherwise applicable to the embodiment of FIG. 2 as well.

As in the embodiment of FIG. 1, the supporting band 112 of the rolling element chain 110 of FIG. 2 has a plurality of recesses 116 for the accommodation of rolling elements 114. In addition, each rolling element 114 is assigned a retaining element 120 having a retaining surface 122. Corresponding to the embodiment of FIG. 1, the retaining elements 120 are arranged in the center section M of the flexible element 118 of the supporting band 112.

The principal difference between the embodiments of FIG. 1 and FIG. 2 consists in that, in the rolling element chain 110 of FIG. 2, the retaining elements 120 are not all located on the same side of the rolling elements 114. Rather, the retaining elements 120 are arranged alternately on the right and left sides of the rolling elements 114. This results in the following alternating structure with regard to the crossbars 118b of the conductor-like element 118 formed by spars 118a and crossbars 118b: while some crossbars 118b are assigned a pair of retaining elements 120, which are assigned to an adjacent pair of rolling elements 114, no single retaining element 120 is provided on the respectively adjacent crossbars 118b.

Figure 3:
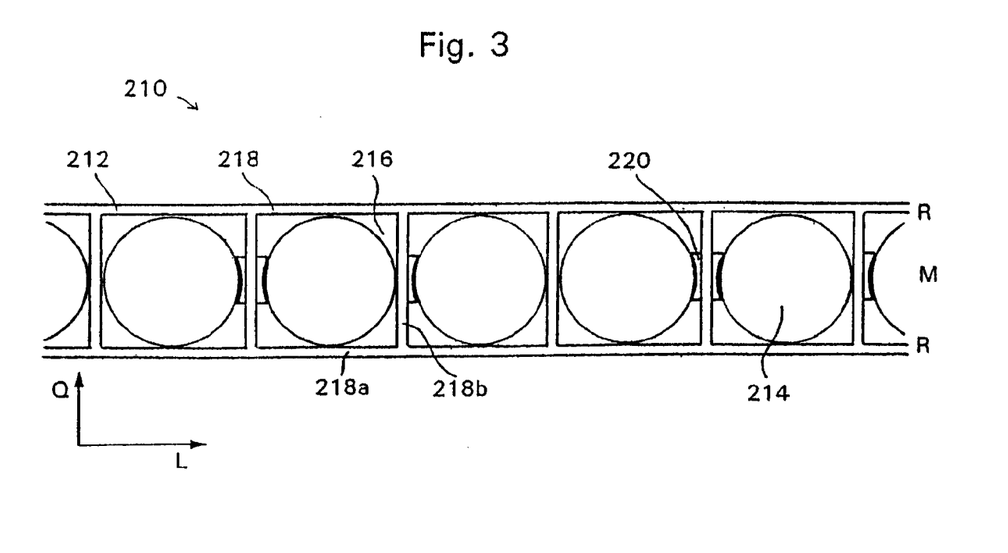

An additional embodiment of a rolling element chain according to the invention is represented in FIG. 3. As compared with FIG. 1, analogous parts are provided with the same reference numerals in FIG. 3, but increased by the number 200. In addition, the embodiment of FIG. 3 is described below only insofar as it differs from the preceding embodiments, to the description of which reference is otherwise hereby expressly made.

The rolling element chain 210 of FIG. 3 corresponds to a combination or mixed form of the embodiments of FIGS. 1 and 2. In other words, with regard to the longitudinal direction L of the flexible element 218 of the supporting band 212, formed by spars 218a and crossbars 218b, the retaining elements 220 assigned to the rolling elements 214 accommodated in the recesses 216 are provided in an unarranged sequence either before or after the rolling elements 214.

Figure 4:
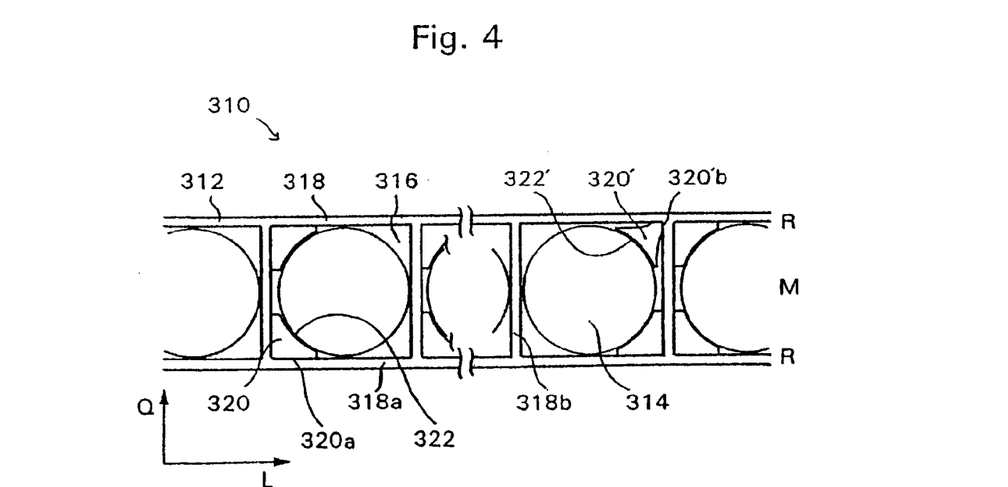

The embodiment of FIG. 4 likewise corresponds substantially to the rolling element chains of FIGS. 1 to 3, described above. Therefore, in FIG. 4 analogous parts are provided with the same reference numerals as in FIG. 1, but increased by the number 300. In addition, the embodiment of FIG. 4 will be described below only insofar as it differs from the embodiments of FIGS. 1 to 3, to the description of which reference is otherwise hereby expressly made.

The rolling element chain 310 of FIG. 4 differs from the chains 10, 110 and 210 principally in that the retaining elements 320 for retaining the rolling elements 314 accommodated in the recesses 316 are arranged in the edge regions R of the supporting band 312, i.e., in the transition regions of the crossbars 318b and the spars 318a of the flexible element 318. As is shown in the left half of FIG. 4, all of the retaining elements 320 may be located on the same longitudinal side of the rolling elements 314, which corresponds to the embodiment of FIG. 1. However, the retaining elements 320 may alternatively be arranged alternating by analogy to the embodiment of FIG. 2, as shown in the right-hand half of FIG. 4. In addition, mixed forms analogous to the embodiment of FIG. 3 are alternatively conceivable.

Still more extensive flexibility of the rolling element chain 310 may be obtained by the use of retaining elements 320', only a single one of which is represented in FIG. 4 for the sake of simplicity. These retaining elements 320' are connected to the spars 318a and, if desired, the ends of the crossbars 318b only by means of a connecting section 320'b located at some distance from the retaining surface 322', while the retaining elements 320 alternatively are connected with the spars 318a via sections 320a adjoining the retaining surfaces 322.

It should be noted that combinations of the embodiments of FIGS. 1 to 4 are alternatively possible.

Figure 5:
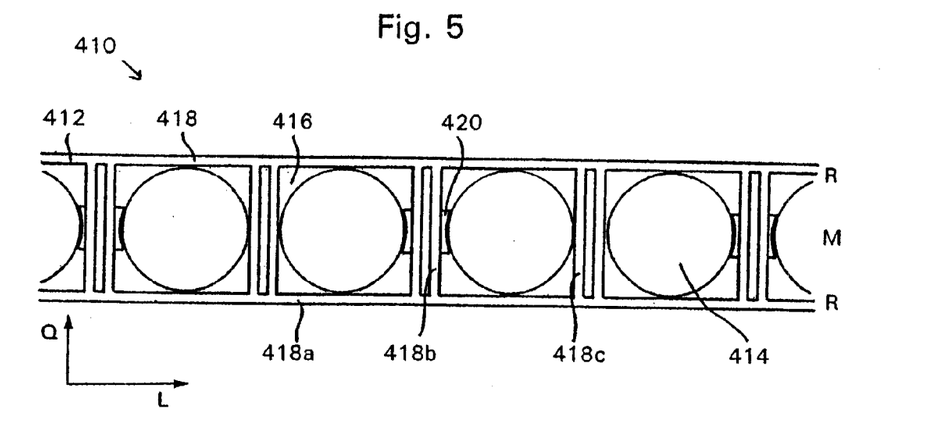

The embodiment of the rolling element chain of FIG. 5 corresponds substantially to that of FIG. 2. In FIG. 5, therefore, analogous parts are provided with the same reference numerals as in FIG. 2, but increased by the number 300, i.e., in comparison with FIG. 1, increased by the number 400. In addition, the embodiment of FIG. 5 will be described below only insofar as it differs from the embodiment of FIG. 2, to the description of reference is otherwise hereby expressly made.

The rolling element chain 410 of FIG. 5 differs from the rolling element chain 110 of FIG. 2 in that each of the sprocket elements or crossbars 418*b* of the flexible element 418 is divided into two partial sprocket elements or crossbars 418*c* by slots running parallel to the transverse direction Q of the supporting band. The partial sprocket elements 418*c*, longitudinally separated from one another in each instance, are arranged on the at least two spar elements 418*a*. At alternate double sprockets 418*b*, pairs of retaining elements 420 are provided for retention of the rolling elements 414 accommodated in the recesses 416, and no single retaining element 420 is provided. In principle, the sprockets or crossbars 418*b* provided with retaining elements 420 could alternatively be designed as a single bar according to the embodiment of FIG. 2.

An embodiment of this kind is particularly advantageous since the number of flexible points due to splitting of the sprocket elements 418*b* into partial sprocket elements 418*c* is increased, which has a positive effect on the flexibility of the supporting band 412.

Figure 6:
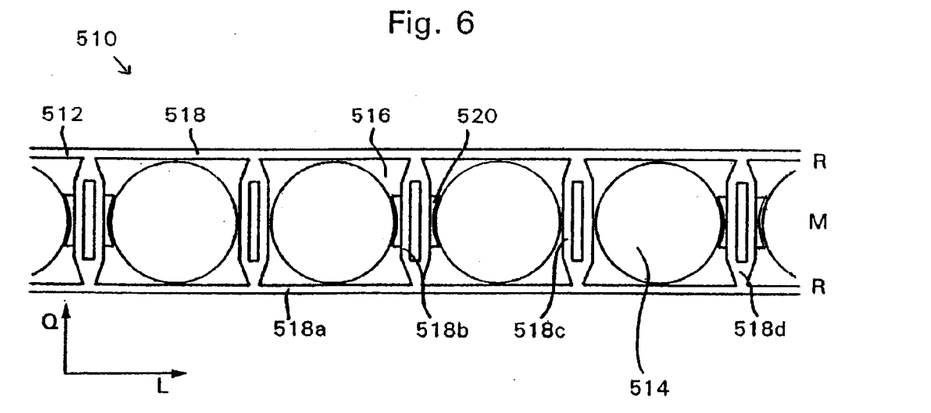

The embodiment of FIG. 6 corresponds substantially to that of FIG. 5. Therefore, in FIG. 6 analogous parts are provided with the same reference numerals as in FIG. 5, but increased by the number 100, i.e., in comparison with FIG. 1 increased by the number 500. In addition, the embodiment of FIG. 6 will be described below only insofar as it differs from the embodiment of FIG. 5, to the description of which reference is otherwise hereby expressly made.

The rolling element chain 510 of FIG. 6 has just as many sprocket elements 518*b* split into partial sprocket elements 518*c* as the chain 410 of FIG. 5. However, it differs from the chain 410 of FIG. 5 in that two partial sprocket elements 518*c* forming a double sprocket element 518*b* are connected via a common crosspiece 518*d* with the spar elements 518*a* of the flexible element 518. In addition, the crosspieces 518*d* may be tapered toward the spar elements 518*a*, which has a positive effect on the flexibility of the supporting band 512. With regard to the arrangement of the retaining elements 520 for retaining the rolling elements 514 accommodated in the recesses 516, the embodiment of FIG. 6 corresponds to that of FIG. 5.

Figure 7:
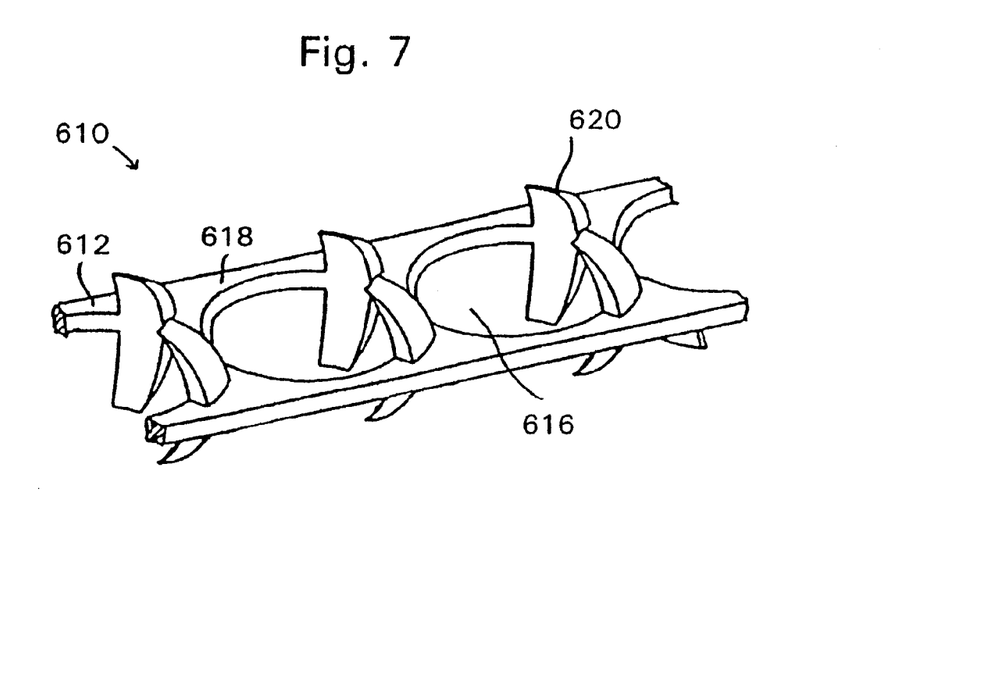
FIGS. 7 and 8 show additional embodiments of the rolling element chain according to the invention in perspective view.

The embodiment of the rolling element chain of FIG. 7 corresponds substantially to that of FIG. 4. Therefore analogous parts in FIG. 7 are provided with the same reference numerals as in FIG. 4, but increased by the number 300, i.e., in comparison with FIG. 1 increased by the number 600. In addition, the embodiment of FIG. 7 will be described below only insofar as it differs from the embodiment of FIG. 4, to the description of which reference is otherwise hereby expressly made.

The rolling element chain 610 of FIG. 7, like the chain 310 of FIG. 4, has retaining elements 620, which are arranged essentially in the edge regions R of the supporting band 612. However, the flexible element 618 of the supporting band 612 of the rolling element chain 610 of FIG. 7 differs from the chain 310 of FIG. 4 in that the recesses 616 for accommodation of the rolling elements are adapted to the shape of the rolling elements, so that substantially the entire peripheral surface of the recesses 616 assumes a function of retaining the rolling elements. In FIG. 7 the recesses 616 are circular, as is appropriate for spherical rolling elements. As will be understood, the recesses 616 may be adapted to other shapes of rolling elements.

Figure 8:
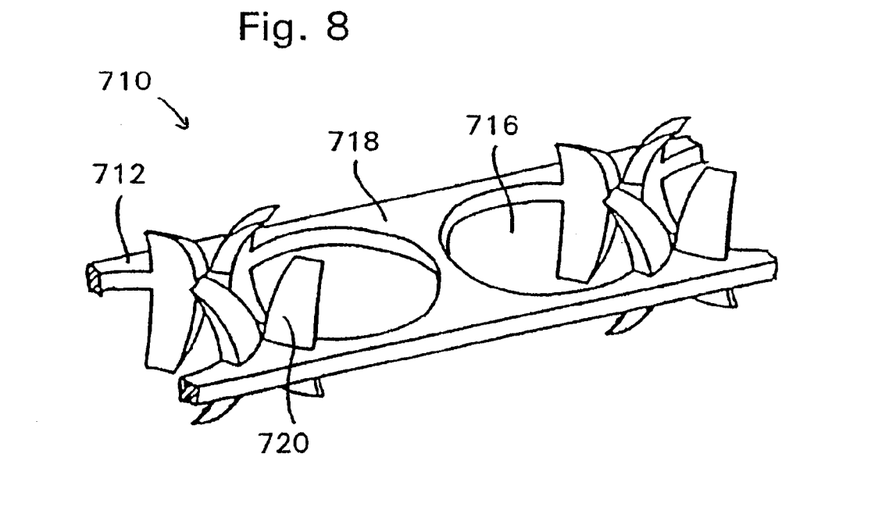

The embodiment of the rolling element chain of FIG. 8 corresponds substantially to that of the chain of FIG. 7. Therefore in FIG. 8 analogous parts are provided with the same reference numerals as in FIG. 7, but increased by the number 100, i.e., in comparison with FIG. 1 increased by the number 700. In addition, the embodiment of FIG. 8 will be described below only insofar as it differs from the embodiment of FIG. 7, to the description of which reference is otherwise hereby expressly made.

The design of the recesses 716 of the flexible element 718 of the supporting band 712 corresponds to the design described in FIG. 7. Consequently, substantially the entire peripheral surface of the recesses 716 in this design of a rolling element chain 710 assumes a function of retaining the rolling elements. However, unlike in the design of the chain 610 of FIG. 7, the arrangement of the retaining elements 720 in the longitudinal direction L with regard to the rolling elements in the design of FIG. 8 is analogous to the arrangement in the design of FIG. 2.

At this point, let it be expressly emphasized that mixed forms of all embodiments represented in FIGS. 1 to 8 and mixed forms with additional possible embodiments are alternatively possible, such as is represented for example in the embodiment of FIG. 3.

In all embodiments explained above the supporting or guide band 12, etc., preferably is in one piece and is made of synthetic material, for example as an injection molding. In this connection, elastomers, such as, for example, polyurethane, hytrel or the like may be considered possible synthetic materials.

Although ball-bearing chains are represented in all of the embodiments of FIGS. 1 to 8 described above, the present invention may alternatively be implemented in rolling element chains provided with other types of rolling elements, such as rollers or the like.

What is claimed is:

1. A rolling element chain, comprising:

a plurality of rolling elements arranged in close succession in a longitudinal direction L; and a longitudinally-extending band for supporting the rolling elements for rolling movement in the longitudinal direction L, the supporting band including (1) a plurality of longitudinally-spaced recesses for accommodating the rolling elements, (2) at least one retaining element assigned to each rolling element, either at its leading side only or at its following side only, for retaining said each rolling element within the respective recess, and (3) at least one longitudinally-extending flexible element for interconnecting the retaining elements.

2. A rolling element chain according to claim 1, wherein the at least one flexible element comprises two flexible strip elements extending in the longitudinal direction L and located at the lateral edge sections R of the supporting band.

3. A rolling element chain according to claim 2, wherein the at least one flexible element comprises:

two spar elements forming the strip elements and running in the longitudinal direction L; and a plurality of sprocket elements extending laterally and interconnecting the two spar elements.

4. A rolling element chain according to claim 1, wherein:

the at least one flexible element defines a longitudinally extending plane; and the retaining elements project above and/or below the plane defined by the flexible element.

5. A rolling element chain according to claim 1, wherein the retaining elements assigned to two longitudinally-adjacent rolling elements are arranged either all before or all after said two rolling elements.

6. A rolling element chain according to claim 5, wherein the retaining elements assigned to all of the rolling elements are arranged either all before or all after the respective rolling elements.

7. A rolling element chain according to claim 1, wherein, for two longitudinally-adjacent rolling elements, the at least one retaining element assigned to one of said two adjacent rolling elements is arranged longitudinally before said one rolling element and the at least one retaining element assigned to the other of said two adjacent rolling element is arranged longitudinally after said other rolling element.

8. A rolling element chain according to claim 7, wherein, for two longitudinally-adjacent rolling elements, either all retaining elements assigned to said two adjacent rolling elements are arranged longitudinally between said two adjacent rolling elements, or no retaining element assigned to either of said two adjacent rolling elements is arranged between said two adjacent rolling elements.

9. A rolling element chain according to claim 7, wherein the at least one retaining element assigned to said one rolling element and the at least one retaining element assigned to said other rolling element are longitudinally separated from one another by means of a laterally-extending sprocket element.

10. A rolling element chain according to claim 9, wherein, for two longitudinally-adjacent rolling elements, either all retaining elements assigned to said two adjacent rolling elements are arranged longitudinally between said two adjacent rolling elements, or no retaining element assigned to either of said two adjacent rolling elements is arranged between said two adjacent rolling elements.

11. A rolling element chain according to claim 9, wherein the sprocket element comprises two partial sprocket elements, the at least one retaining element assigned to said one rolling element is assigned to one partial sprocket element, and the at least one retaining element assigned to said other rolling element is assigned to the other partial sprocket element.

12. A rolling element chain according to claim 11, wherein:

the at least one flexible element comprises two flexible strip elements extending in the longitudinal direction L and located at the lateral edges of the supporting band;

the recesses are bounded on each longitudinal side by a sprocket element extending laterally between the strip elements;

at least one of the sprocket elements comprises two partial sprocket elements; and the two partial sprocket elements are connected, separated longitudinally from one another, by at least one spar element.

13. A rolling element chain according to claim 12, wherein the two partial sprocket elements are connected with the at least one spar element via a common crosspiece.

14. A rolling element chain according to claim 13, wherein the common crosspiece is tapered toward the at least one spar element.

15. A rolling element chain according to claim 1, wherein each rolling element is assigned a single retaining element arranged in a center section M of the supporting band.

16. A rolling element chain according to claim 1, wherein each rolling element is assigned at least two retaining elements arranged in lateral edge sections R of the supporting band.

17. A rolling element chain according to claim 1, wherein each rolling element is retained by, on the one hand, the at least one retaining element assigned to it and, on the other, by substantially the entire peripheral surface of the recess accommodating said rolling element.

18. A rolling element chain according to claim 1, wherein each retaining element has a retaining surface adapted to the outer contour of the rolling element to which it is assigned.

19. A rolling element chain according to claim 1, wherein the supporting band comprises a one piece structure.

20. A rolling element chain according to claim 1, wherein the supporting band is made of synthetic material.

21. A rolling element chain according to claim 1, wherein the supporting band is injection molded.

22. A rolling element chain according to claim 1, wherein the rolling elements are rollers or balls.

* * * * *

UNITED STATES PATENT AND TRADEMARK OFFICE
CERTIFICATE OF CORRECTION

PATENT NO. : 6,575,630 B2 Page 1 of 1
DATED : June 10, 2003
INVENTOR(S) : Blaurock et al.

It is certified that error appears in the above-identified patent and that said Letters Patent is hereby corrected as shown below:

Title page,
Please insert Item,
-- [30] Foreign Application Priority Data:
(DE)  201 01 760  2/2000 --

Column 3,
Line 10, "retained," should read -- retained --
Line 47, "hytrel" should read -- Hytrel® --

Column 5,
Line 44, "FIG." should read -- FIG. 1 --

Column 8,
Line 29, "hytrel" should read -- Hytrel® --

Column 9,
Line 14, "element" should read -- elements --

Signed and Sealed this

Sixteenth Day of December, 2003

JAMES E. ROGAN
*Director of the United States Patent and Trademark Office*